C. C. HOLE.
SHUTTER FOR HEADLIGHTS.
APPLICATION FILED JULY 3, 1914.

1,149,053.

Patented Aug. 3, 1915.

Inventor
C. C. Hole
By Victor J. Evans
Attorney

Witnesses
E. R. Ruppert
V. B. Hillyard

UNITED STATES PATENT OFFICE.

CHARLES C. HOLE, OF FREMONT, NEBRASKA.

SHUTTER FOR HEADLIGHTS.

1,149,053.   Specification of Letters Patent.   Patented Aug. 3, 1915.

Application filed July 3, 1914. Serial No. 848,889.

*To all whom it may concern:*

Be it known that I, CHARLES C. HOLE, a citizen of the United States, residing at Fremont, in the county of Dodge and State of Nebraska, have invented new and useful Improvements in Shutters for Headlights, of which the following is a specification.

Vehicles equipped with headlights require highways to be properly illuminated to avoid accidents and when traveling through the streets of cities and other thickly settled districts, such headlights are required to be dimmed in order to prevent the blinding glare from seriously affecting pedestrians, horses, and the drivers of vehicles generally.

The present invention has relation to means under the control of the driver whereby the blinding glare of the headlights may be overcome without entirely cutting off the light, thereby enabling the operator to avoid any objectionable glare and at the same time shedding sufficient light to prevent a driver from colliding with the vehicle.

The invention consists of a shutter pivotally mounted and actuating means whereby such shutter may be thrown out of the way or in position to dim the light and prevent the blinding glare which under certain conditions is objectionable.

The invention consists of the novel features, details of construction and combination of parts, which hereinafter will be more particularly set forth, illustrated and claimed.

Figure 1:
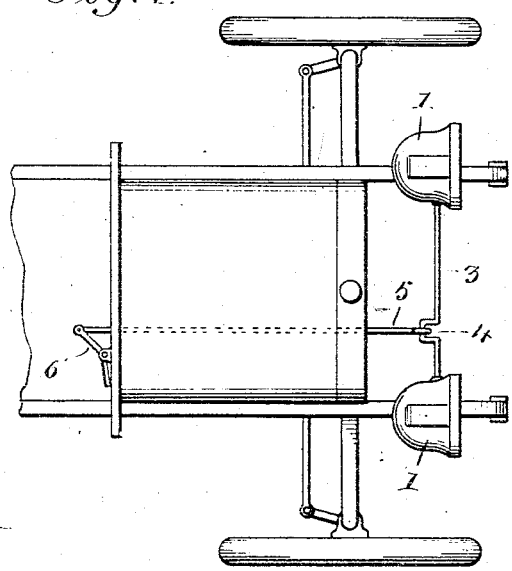
Figure 2:
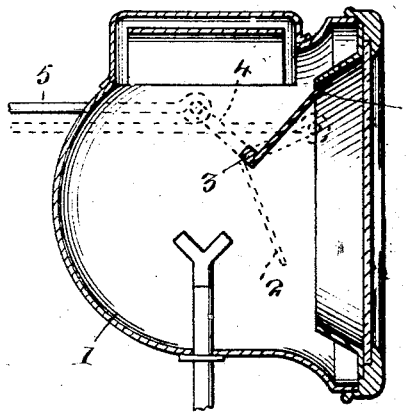
Figure 3:
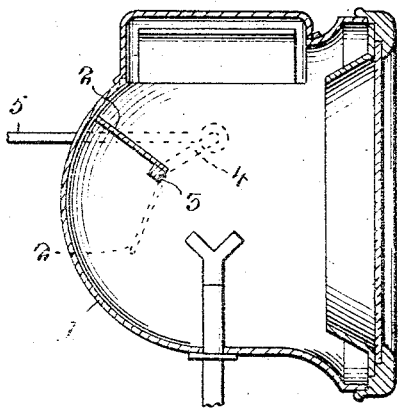
Figure 4:
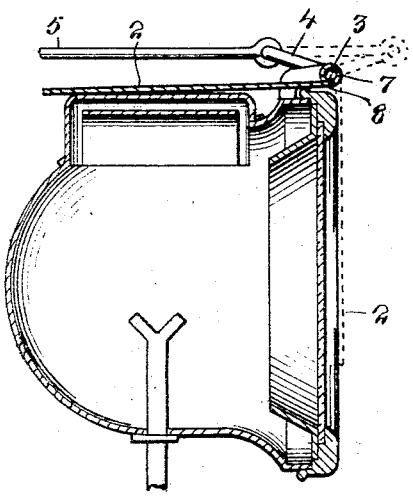
Figure 5:
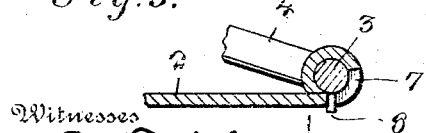
Figure 6:

In the drawings hereto attached:—Figure 1 is a top plan view showing the invention applied to the head lamps of a motor vehicle such as an automobile. Fig. 2 is a vertical central longitudinal section of one of the head lamps, the full lines showing the shutter elevated and the dotted lines indicating the position of the shutter when dropped to dim the light. Figs. 3 and 4 are views similar to Fig. 2 of modifications. Fig. 5 is an enlarged sectional detail showing the connection between the rod and shutter and illustrating the relation of the parts when the shutter is moved so as to rest upon the lamp. Fig. 6 is a view of the parts shown in Fig. 5 illustrating the relation of the elements when the shutter is moved to obstruct the light.

Corresponding and like parts are referred to in the following description, and indicated in all the views of the drawings, by the same reference characters.

The numeral 1 designates the head lamps such as generally provided upon a motor vehicle of the automobile type. These lamps are generally equipped with strong illuminators which cast a blinding light, the bodies or casings of the lamps being provided with highly polished reflectors for throwing the rays of light to an appreciable distance in advance of the vehicle. A shutter 2 is pivotally mounted so as to be thrown upwardly out of the way or downwardly to intercept the rays of light and thereby prevent the objectionable blinding glare. The shutter 2 is attached to a rod or shaft 3 which is journaled to the lamp. The rod or shaft 3 is formed with a crank portion or arm 4 and a rod or like part 5 connects the crank portion or arm 4 with a foot-operated lever 6 which is arranged conveniently to be engaged by the foot of the operator. Movement of the lever 5 in one direction throws the shutter downward as indicated by the dotted lines whereby the rays of light are intercepted and the blinding glare overcome. The shutter is so disposed and of such relative length as not to shut off the rays of light entirely, thereby leaving sufficient light so that the operator may observe the roadway for a short distance ahead while at the same time the driver of a passing vehicle is relieved of the blinding glare. As indicated in Fig. 1, the rod or shaft 3 extends from one lamp to the other and is journaled in each of the lamps. In the preferable arrangement, the shutter is located in advance of the light.

Fig. 3 shows an arrangement in which the rod or shaft 3 is located in the rear of the light and between the light and the reflector. In this case, the shutter 2 when lowered intercepts the rays of light which would otherwise be thrown forward by the reflector thereby preventing the glare.

In Fig. 4 the rod is located in the front of the lamp and above the same, and the shutter 2 is arranged to drop in front of the lamp or to fold upon the same as indicated by the dotted and full lines.

In each of the modifications, a shutter supporting rod or shaft 3 is adapted to be operated by means of a foot-controlled lever in the manner stated herein.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Inasmuch as provision must be had for a greater movement of the shutter than the crank in the modification illustrated in Fig. 4, the knuckle of the shutter is formed with a slot 7 in which a pin 8 projecting from the rod or shaft 3 is arranged to operate. The slot 7 extends about one-fourth of the circumference of the knuckle so that while the crank or arm 4 has a movement of about 180°, the shutter has an approximate movement of 270°. This is obvious from the full and dotted lines of Fig. 4. Upon turning the rod or shaft 3 to move the crank from the position indicated in Fig. 5 to the position shown in Fig. 6, the pin 8 engages the closed end of the slot 7 and moves the shutter 2 past the vertical when such shutter will drop into the position indicated in Fig. 6 and by the dotted lines in Fig. 4. When the crank or arm 4 is moved from the position shown in Fig. 6 to the position indicated in Fig. 5, the shutter 2 is carried past the vertical and drops into the position indicated in Figs. 4 and 5.

Having thus described the invention, what is claimed as new is:—

The combination with the head lamp of a vehicle, of a shutter comprising a knuckle along one edge thereof having a through slot extending transversely of one side thereof, a shaft passing through and adapted to turn within said knuckle and provided with an operating arm, and a pin projecting from said shaft and passing through the slot formed in the knuckle of the shutter, the arrangement specified permitting the shutter to move through a greater arc than the shaft.

In testimony whereof I affix my signature in presence of two witnesses.

CHARLES C. HOLE.

Witnesses:
 FRED VOLPP,
 W. G. HENATSCH.